United States Patent
Isobe et al.

(10) Patent No.: US 7,791,261 B2
(45) Date of Patent: *Sep. 7, 2010

(54) ULTRAVIOLET EXCITED LIGHT-EMITTING DEVICE

(75) Inventors: Toshinori Isobe, Tsukuba (JP); Takashi Kunimoto, Kurayoshi (JP); Susumu Miyazaki, Toride (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 714 days.

This patent is subject to a terminal disclaimer.

(21) Appl. No.: 10/559,378

(22) PCT Filed: Jun. 3, 2004

(86) PCT No.: PCT/JP2004/008082

§ 371 (c)(1),
(2), (4) Date: Dec. 6, 2005

(87) PCT Pub. No.: WO2004/111155

PCT Pub. Date: Dec. 23, 2004

(65) Prior Publication Data

US 2006/0150865 A1  Jul. 13, 2006

(30) Foreign Application Priority Data

Jun. 11, 2003 (JP) .............................. 2003-166085

(51) Int. Cl.
- *H01J 1/62* (2006.01)
- *H01J 1/63* (2006.01)
- *H01J 63/04* (2006.01)
- *C09K 11/08* (2006.01)

(52) U.S. Cl. ................................. 313/486; 252/301.4 F

(58) Field of Classification Search ........... 252/301.4 F; 313/486

See application file for complete search history.

(56) References Cited

U.S. PATENT DOCUMENTS

| 6,802,990 B2 | 10/2004 | Toda et al. | |
| 7,011,770 B2 * | 3/2006 | Imanari et al. | ........ 252/301.4 F |
| 2002/0038861 A1 * | 4/2002 | Toda et al. | ............ 252/301.4 F |
| 2004/0080271 A1 | 4/2004 | Aoki et al. | |
| 2007/0029524 A1 | 2/2007 | Isobe et al. | |

FOREIGN PATENT DOCUMENTS

| EP | 1 193 306 A2 | 4/2002 |
| EP | 1 321 500 A2 | 6/2003 |
| JP | 2002-285147 A | 10/2002 |
| JP | 2002-332481 A | 11/2002 |
| JP | 2003-142004 A | 5/2003 |
| WO | 03/036675 A1 | 5/2003 |
| WO | 2004/101710 A1 | 11/2004 |

* cited by examiner

*Primary Examiner*—David M. Brunsman
*Assistant Examiner*—Kevin M Johnson
(74) *Attorney, Agent, or Firm*—Sughrue Mion, PLLC

(57) ABSTRACT

An ultraviolet excited light-emitting device is disclosed. The ultraviolet excited light-emitting device comprises a phosphor having at least one selected from the group consisting of Eu and Mn as an activator and a compound represented by a formula (1):

$$M^1M^2M^3_2O_6 \qquad (1)$$

wherein $M^1$ is at least two selected from the group consisting of Ca, Sr and Ba, or Sr or Ba, $M^2$ is at least one selected from the group consisting of Mg and Zn, and $M^3$ is at least one selected from the group consisting of Si and Ge in the formula (1).

2 Claims, No Drawings

ULTRAVIOLET EXCITED LIGHT-EMITTING DEVICE

TECHNICAL FIELD

The present invention relates to an ultraviolet excited light-emitting device.

BACKGROUND ART

An ultraviolet excited light-emitting device include cold cathode tube, three wavelength type fluorescent lamps and the like, and is applied to a backlight for a liquid crystal display. An ultraviolet excited light-emitting device (cold cathode tube) applied to a backlight comprises a substrate, a phosphor and an electrode.

The ultraviolet excited light-emitting device including a phosphor represented by $CaMgSi_2O_6$:Eu is known, however, in viewpoint of enhancing brightness of liquid crystal display, ultraviolet excited light-emitting device having higher brightness are desired.

DISCLOSURE OF THE INVENTION

The object of the present invention is to provide an ultraviolet excited light-emitting device having high brightness.

The present inventors have studied to solve the problems described above and then completed the present invention.

The present invention provides an ultraviolet excited light-emitting device comprising a phosphor including at least one selected from the group consisting of Eu and Mn as an activator and a compound represented by a formula (1):

$$M^1 M^2 M^3_2 O_6 \qquad (1)$$

wherein $M^1$ is at least two selected from the group consisting of Ca, Sr and Ba, or Sr or Ba, $M^2$ is at least one selected from the group consisting of Mg and Zn, and $M^3$ is at least one selected from the group consisting of Si and Ge in the formula (1).

MODE FOR CARRYING OUT THE INVENTION

The phosphor in the ultraviolet excited light-emitting device of the present invention includes a compound represented by the above formula (1) and an activator.

In the formula (1), $M^1$ is a divalent metal element, and a combination of Ca and Sr, a combination of Ca and Ba, a combination of Sr and Ba, a combination of Ca, Sr and Ba, Sr or Ba.

In the formula (1), $M^2$ is a divalent metal element, and a combination of Mg and Zn, Mg or Zn, preferably Mg.

In the formula (1), $M^3$ is a quaternary metal element, and a combination of Si and Ge, Si or Ge, preferably Si.

The activator is a combination of Eu and Mn, Eu or Mn, preferably Eu.

The phosphor is preferably a compound represented by the following formula (2) including Eu as an activator, more preferably the compound further satisfying a being more than 0 and not more than 0.1;

$$(M^1_{1-a} Eu_a) M^2 M^3_2 O_6 \qquad (2)$$

wherein, in the formula (2), each of $M^1$, $M^2$ and $M^3$ is same to respective $M^1$, $M^2$ and $M^3$ in the formula (1)).

Among these compounds, a compound represented by the following formula (3) wherein $M^1$ is a combination of Ca and Sr, $M^2$ is Mg and $M^3$ is Si is particularly preferable;

$$Ca_{1-b-c} Sr_b Eu_c MgSi_2 O_6 \qquad (3)$$

wherein, in the formula (3), b is more than 0.1, preferably not less than 0.2 and not more than 0.4, and c is more than 0, preferably not less than 0.003 and not more than 0.1, preferably not more than 0.05.

The phosphor in the ultraviolet excited light-emitting device of the present invention, in viewpoint of enhancing brightness, preferably has the same crystal structure as diopside.

The phosphor in the ultraviolet excited light-emitting device of the present invention has usually an average particle diameter of about not less than 0.5 μm and about not more than 8 μm.

The phosphor in the ultraviolet excited light-emitting device of the present invention may be produced by calcining a metal compound with a composition ratio of the phosphor having a compound represented by the formula (1) and an activator. For example, at least two metal compounds are weighed to obtain a predetermined composition, followed by mixing, and then the mixture is calcined.

The metal compounds include calcium compounds, strontium compounds, barium compounds, europium compounds, manganese compounds, magnesium compounds, zinc compounds, silicon compounds and germanium compounds, compounds containing these metals. Examples of the compounds include high purity (about 99% by weight or more of purity) hydroxides, carbonates, nitrates, halides and oxalates which can be converted to an oxide by decomposition at high temperature, or high purity (about 99% by weight or more of purity) oxides.

The metal compounds are weighed to form predetermined composition. For example, when producing a phosphor represented by a formula of $Ca_{0.792}Sr_{0.2}Eu_{0.008}MgSi_2O_6$, $CaCO_3$, $SrCO_3$, $Eu_2O_3$, MgO and $SiO_2$ may be mixed in molar ratio of 0.792:0.2:0.004:1:2. When producing a phosphor represented by a formula of $Ca_{0.692}Sr_{0.296}Eu_{0.012}MgSi_2O_6$, $CaCO_3$, $SrCO_3$, $Eu_2O_3$, MgO and $SiO_2$ may be mixed in molar ratio of 0.692:0.296:0.006:1:2.

The weighed metal compounds may be mixed, for example, by a ball mill, V-shape mixer, a vessel equipped with agitator. To enhance crystallinity of the phosphor obtained and control crystal size, the metal compounds may be added with appropriate amount of a flux to be mixed. Examples of the flux include LiF, NaF, KF, LiCl, NaCl, KCl, $Li_2CO_3$, $Na_2CO_3$, $K_2CO_3$, $NaHCO_3$, $NH_4Cl$, $NH_4I$ and the like.

Calcination of the mixture is preferably carried out under a reductive atmosphere, for example, preferably under a nitrogen ($N_2$) atmosphere containing hydrogen from about 0.1% by volume to about 10% by volume or under an argon (Ar) atmosphere containing hydrogen from about 0.1% by volume to about 10% by volume. To gain highly reductive effect, a mixture of at least two metal compounds may be added with an appropriate amount of carbon, and then the mixture may be calcined; or at least two metal compounds may be mixed with an appropriate amount of carbon, and then the mixture may be calcined. Calcination is usually carried out under conditions of temperature: from about 900° C. to about 1500° C., and time: about 1 hour to about 100 hours.

When a compound which can be converted to an oxide by decomposition at high temperature such as hydroxide, carbonate, nitrate, halide and oxalate is contained in the mixture above, the mixture may be pre-calcined before calcination. The pre-calcination may be carried out under an oxidative atmosphere (for example, in air) or reductive atmosphere. The pre-calcination may be carried out at a temperature to remove crystal water in hydroxide, carbonate, nitrate, halide and oxalate, or at a temperature to convert hydroxide, carbonate, nitrate, halide and oxalate to an oxide, usually carried out from about not less than 400° C. and about less than 900° C.

The phosphor obtained by calcination may be pulverized, washed or classified. Pulverization may be carried out by using a ball mill or a jet mill. Thus obtained phosphor may be subjected to heat treatment. By the heat treatment, a phosphor having much higher brightness may be produced. The heat treatment may be carried out under similar conditions to the calcination. The heat treatment may be carried out twice or more.

The ultraviolet excited light-emitting device of the present invention includes the phosphor described above, usually includes the phosphor and a substrate. The ultraviolet excited light-emitting device preferably includes a substrate and a phosphor layer on the substrate. Examples of other ultraviolet excited light-emitting device include cold cathode tubes (of a backlight for liquid crystal display), three wavelength type fluorescent lamps and the like. The ultraviolet excited light-emitting devices usually include the phosphor described above, a red phosphor, a green phosphor, a substrate and an electrode. The red phosphor may be excited by ultraviolet rays to emit red light, but should not be particularly limited thereto. The green phosphor may be excited by ultraviolet rays to emit green light, but should not be not particularly limited thereto.

The ultraviolet excited light-emitting device described above is excited by irradiation of ultraviolet rays, preferably of a light with wavelength of more than about 200 nm and not more than about 400 nm, to emit blue light with high brightness.

A method for producing an ultraviolet excited light-emitting device is explained with high intensity fluorescent lamp (=a lamp having high power consumption per unit area of the lamp wall). The high intensity fluorescent lamp may, for example, be manufactured by a method comprising the steps of (i) to (vi):

(i) mixing the blue phosphor described above with a solvent (aqueous polyethylene oxide solution and the like);

(ii) coating the coating solution obtained on an inner wall of a substrate (glass tube and the like);

(iii) drying the coating film obtained, if necessary;

(iv) calcining the coating film at from 300 to 600° C.;

(v) attaching an electrode (filament and the like) on the substrate; and (vi) exhausting the substrate, followed by enclosing a rare gas (Ar, Kr, Ne and the like) and mercury, and then capping.

EXAMPLES

The present invention is described in more detail by following Examples, which should not be construed as a limitation upon the scope of the present invention. Brightness of an ultraviolet excited light-emitting device was measured by the following method. Brightness of ultraviolet excited light-emitting element:

The measurement was carried out by irradiating ultraviolet rays of 254 nm wavelength (bright line of mercury) with a mercury lamp.

REFERENCE

Calcium carbonate (manufactured by Ube Material Industries, Ltd., $CaCO_3$), europium oxide (manufactured by Shin-Etsu Chemical Co., Ltd., $Eu_2O_3$), magnesium carbonate (manufactured by Kyowa Chemical Industry Co., Ltd., $MgCO_3$) and silicon dioxide $SiO_2$ (manufactured by NIPPON AEROSIL CO., LTD., $SiO_2$) were weighed in a manner such that the molar ratio of $CaCO_3:Eu_2O_3:MgCO_3:SiO_2$ was 0.992:0.004:1:2, and then mixed; thereafter, the mixture was calcined under $N_2$ atmosphere containing $H_2$ of 2% by volume at 1200° C. for 2 hours. The calcined material was subjected to a heat treatment under $N_2$ atmosphere containing $H_2$ of 2% by volume at 1200° C. for 2 hours. The heat treatment was conducted once more. The phosphor obtained had the same crystal structure as diopside and included a compound represented by a formula of $Ca_{0.992}Eu_{0.008}MgSi_2O_6$.

The phosphor described above was put on a glass substrate to form a phosphor layer to obtain an ultraviolet excited light-emitting device. The ultraviolet excited light-emitting device emitted blue light by irradiation of ultraviolet rays. The brightness of the ultraviolet excited light-emitting device was assumed to be 100.

Example 1

Calcium carbonate (manufactured by Ube Material Industries, Ltd., $CaCO_3$), strontium carbonate (manufactured by Wako Pure Chemical Industries, Ltd., $SrCO_3$), europium oxide (manufactured by Shin-Etsu Chemical Co., Ltd., $Eu_2O_3$), magnesium carbonate (manufactured by Kyowa Chemical Industry Co., Ltd., $MgCO_3$) and silicon dioxide $SiO_2$ (manufactured by NIPPON AEROSIL CO., LTD., $SiO_2$) were weighed in a manner such that the molar ratio of $CaCO_3:SrCO_3:Eu_2O_3:MgCO_3:SiO_2$ was 0.932:0.06:0.004:1:2, and then mixed; thereafter, the mixture was calcined under $N_2$ atmosphere containing $H_2$ of 2% by volume at 1180° C. for 2 hours. The calcined material was subjected to a heat treatment under $N_2$ atmosphere containing $H_2$ of 2% by volume at 1200° C. for 2 hours. The heat treatment was conducted once more. The phosphor obtained had the same crystal structure as diopside and included a compound represented by a formula of $Ca_{0.932}Sr_{0.06}Eu_{0.008}MgSi_2O_6$.

The phosphor described above was put on a glass substrate to form a phosphor layer to obtain an ultraviolet excited light-emitting device. The ultraviolet excited light-emitting device emitted blue light by irradiation of ultraviolet rays. The ultraviolet excited light-emitting device had a brightness of 136.

Example 2

Except that the molar ratio of $CaCO_3:SrCO_3:EU_2O_3:MgCO_3:SiO_2$ was changed to 0.792:0.2:0.004:1:2, the same operation in Example 1 was conducted. The phosphor obtained had the same crystal structure as diopside and included a compound represented by a formula of $Ca_{0.792}Sr_{0.2}Eu_{0.008}MgSi_2O_6$.

The phosphor described above was put on a glass substrate to form a phosphor layer to obtain an ultraviolet excited light-emitting device. The ultraviolet excited light-emitting device emitted blue light by irradiation of ultraviolet rays. The ultraviolet excited light-emitting device had a brightness of 213.

Example 3

Except that the molar ratio of $CaCO_3:SrCO_3:Eu_2O_3:MgCO_3:SiO_2$ was changed to 0.692:0.3:0.004:1:2, the same operation in Example 1 was conducted. The phosphor obtained had the same crystal structure as diopside and included a compound represented by a formula of $Ca_{0.692}Sr_{0.3}Eu_{0.008}MgSi_2O_6$.

The phosphor described above was put on a glass substrate to form a phosphor layer to obtain an ultraviolet excited light-emitting device. The ultraviolet excited light-emitting device emitted blue light by irradiation of ultraviolet rays. The ultraviolet excited light-emitting device had a brightness of 226.

Example 4

Except that the molar ratio of $CaCO_3:SrCO_3:EU_2O_3:MgCO_3:SiO_2$ was changed to 0.692:0.296:0.006:1:2, the same operation in Example 1 was conducted. The phosphor obtained had the same crystal structure as diopside and included a compound represented by a formula of $Ca_{0.692}Sr_{0.296}Eu_{0.012}MgSi_2O_6$.

The phosphor described above was put on a glass substrate to form a phosphor layer to obtain an ultraviolet excited light-emitting device. The ultraviolet excited light-emitting device emitted blue light by irradiation of ultraviolet rays. The ultraviolet excited light-emitting device had a brightness of 231.

What is claimed is:

1. An ultraviolet excited light-emitting device comprising a phosphor which comprises a compound represented by a formula (3);

$$Ca_{1-b-c}Sr_bEu_cMgSi_2O_6 \qquad (3)$$

wherein b is more than 0.1 and not more than 0.4 and c is more than 0 and not more than 0.1.

2. The ultraviolet excited light-emitting device according to claim 1, wherein the wavelength of ultraviolet is more than about 200 nm and not more than about 400 nm.

* * * * *